United States Patent [19]

Pischinger et al.

[11] Patent Number: 4,515,343

[45] Date of Patent: May 7, 1985

[54] ARRANGEMENT FOR ELECTROMAGNETICALLY OPERATED ACTUATORS

[75] Inventors: Franz Pischinger; Peter Kreuter, both of Aachen, Fed. Rep. of Germany

[73] Assignee: Fev Forschungsgesellschaft für Energietechnik und ver Brennungsmotoren mbH, Aachen, Fed. Rep. of Germany

[21] Appl. No.: 594,121

[22] Filed: Mar. 28, 1984

[30] Foreign Application Priority Data

Mar. 28, 1983 [DE] Fed. Rep. of Germany ....... 3311280
Mar. 28, 1983 [DE] Fed. Rep. of Germany ....... 3311250

[51] Int. Cl.³ .................................................. F16K 31/04
[52] U.S. Cl. ........................................ 251/48; 251/137; 251/129; 123/90.11; 335/257; 335/258
[58] Field of Search .................. 251/48, 129, 137; 123/90.11, 90.19, 90.55, 90.57, 90.58; 188/196 A, 204 R; 335/257, 258, 277

[56] References Cited

U.S. PATENT DOCUMENTS

| | | | |
|---|---|---|---|
| 2,923,521 | 2/1960 | Ray | 335/257 X |
| 3,833,102 | 9/1974 | Stähle | 192/111 A |
| 4,312,494 | 1/1982 | Aoyama | 251/48 |
| 4,457,270 | 7/1984 | Kodama et al. | 123/90.58 |

FOREIGN PATENT DOCUMENTS

| | | | |
|---|---|---|---|
| 218893 | 5/1958 | Australia | 123/90.57 |
| WO81/01626 | 6/1981 | PCT Int'l Appl. | 251/129 |
| 573601 | 9/1977 | U.S.S.R. | 123/90.55 |

*Primary Examiner*—Samuel Scott
*Assistant Examiner*—Allen J. Flanigan
*Attorney, Agent, or Firm*—Watson, Cole, Grindle & Watson

[57] ABSTRACT

An arrangement for an electromagnetically operated actuator for a displacement-type engine having a spring-mass valve actuating oscillatory system which includes a valve having an armature thereon and a pair of electromagnets for maintaining the valve in at least first and second final operational positions of the maximum amplitude of vibration, the armature and at least one of the electromagnets comprising a contact dampener for the armature, at least one of the electromagnets being mounted in the housing by a hydraulic length-compensating element such that the distance between the valve seat and the pole area of the electromagnet is adjusted to correspond to the distance between the valve head and the pole area of the armature, so that the desired amount of dampening is consistently effected as the armature approaches the electromagnet and the valve approaches its seat.

23 Claims, 10 Drawing Figures

ARRANGEMENT FOR ELECTROMAGNETICALLY OPERATED ACTUATORS

RELATED APPLICATION

This application relates to U.S. Ser. No. 594,281, filed on even date herewith, commonly assigned, and claiming priority based on West German Patent Application No. P 33 11 280.0, filed Mar. 28, 1983.

BACKGROUND OF THE INVENTION

This invention relates to electromagnetically operated actuators for a displacement-type engine having a spring-mass valve actuating oscillatory system maintained by electromagnets in at least two final operational positions of the maximum amplitude of vibration, so that at least two discrete operational positions result in which the dwell time in each such position is controlled by selected excitation of the electromagnets.

Such an actuator, of the general aforementioned type, is required to be adjusted with a very high degree of precision, to avoid functional breakdown, due to manufacturing tolerances, heat expansion, wear, etc., which may occur because the actuated control element (e.g., a valve) and the actuating mechanism (e.g., the armature) do not assume their function-performing operational positions at the same time, i.e., the valve being seated on its valve seat at the same time the armature makes contact with the valve closing electromagnet.

In this regard, West German Pat. No. 23 35 150 provides for a clearance within the transmission element between the actuating mechanism and the valve so that, for valve closing, the contact between the armature and the electromagnet occurs at the same time as the seating of the valve. The impact of the armature on the electromagnet is absorbed by disc springs which are compressed toward the end of the particular stroke involved.

In U.S. Ser. No. 278,393, filed June 29, 1981, now U.S. Pat. No. 4,455,543, an elastic connection is made between the valve stem and the armature to effect the necessary compensation in length and, at the same time, the impact between the armature and the electromagnet is subjected to some dampening.

Also, in order to avoid high mechanical stresses on the contact surfaces, as well as to reduce the noise excitation and chatter as relatively moving parts impact against one another, parts have been used, in conjunction with electromagnets, that produce a pneumatic dampening during all or only a portion of the movements through forces involving a change of volume of enclosed gas. However, special additional parts are required which do not form constituent parts of the electromagnet.

Moreover, dampeners have been directly or indirectly connected to the moving parts of an electromagnetically operated actuator to effect dampening within desired ranges of movement. West German Pat. No. 105 5 091 discloses such an arrangement in which an auxiliary damper is provided for the electromagnet. Dampening is effected by a bellows which is fixedly connected to the armature and is compressed, upon impact against stops, toward the end of its movement, so that the enclosed air space is compressed and is caused to be discharged through an opening. Thus, dampening occurs toward the end of the armature movement.

This type of dampening by the use of auxiliary elements, however, requires a more complex construction for the dampers, for the parts which transmit movement to the armature, and to assure contact engagement between the intended relatively movable elements.

SUMMARY OF THE INVENTION

It is therefore an object of the present invention to provide an arrangement for an electromagnetically operated actuator for a displacement-type engine having a spring-mass valve actuating oscillatory system in which impact of the armature on the electromagnet is dampened and at the same time accurate maintenance of the actuated control element at the two final operational positions is retained. Moreover, the complexity of construction, space requirements and number of moving parts is reduced with the present arrangement, and the operational safety factor is increased by automatically and accurately adjusting the actuator with respect to the final positions of the moving parts.

According to the invention, this general objective is achieved by enclosing a volume air between the armature and the electromagnet, wherein a closed space is formed by elastomeric walls, or is formed stationary walls with limited clearances between the moving and fixed components just prior to reaching the operational positions. When rigid walls are provided to delimit the volume of air between confronting surfaces of the armature and the electromagnet, clearances are defined between the relatively movable armature and the electromagnet to allow the air to be vented upon contact between such surfaces. Otherwise, the elastomeric walls may be provided to delimit the volume of air, and a vent port or ports are provided in the armature, in the magnet or in the elastomeric walls. Through energy conversion, the escape of the compressed volume of air through these ports causes the armature to encounter dampening as it reaches the operational positions of the armature on the electromagnets. This dampened movement of the armature is transmitted to the valve by a positive or a friction-type connection between the armature and the valve. With the present arrangement, it is assured that the approach of the valve to its seat is substantially coincident with the approach of the armature to the electromagnet. Thus effected is the necessary positioning of at least one of the electromagnets relative to the valve seat, or the positioning of the armature relative to the valve head in the case of stationary electromagnets, and thereby compensate for manufacturing tolerances, heat expansion and wear.

In accordance with the invention, all the moving parts of the actuator encounter dampening as they reach their operational positions, so that noise excitation is substantially avoided and mechanical stresses are considerably reduced upon impact. Another advantage is that the dampening operation can be carried out within the space occupied by the electromagnet itself and, at the same time, the system complexity for the dampening operation is reduced. Moreover, no adjustment is required during assembly or maintenance. During operation, changes in length of the operated actuator or actuators through heat expansion are automatically equalized.

Furthermore, the present arrangement includes the provision of a hydraulic length-compensating element for mounting one of the electromagnets on the housing in which the valve operates for adjusting the distance between the valve seat and the pole area on the electromagnet to the distance between the valve head and the pole face of the armature, so that the desired amount of dampening is consistently effected as the armature approaches the electromagnet and the valve head approaches its valve seat.

According to another embodiment of the invention, the hydraulic length-compensating element is provided for connecting the armature to the valve for adjusting the distance between the valve head and the pole area of the armature to the distance between the valve seat and the pole area of the electromagnet, so that the desired amount of dampening is consistently effected as the armature approaches the electromagnet and the valve head approaches its valve seat.

DETAILED DESCRIPTION OF THE INVENTION

Figure 1:
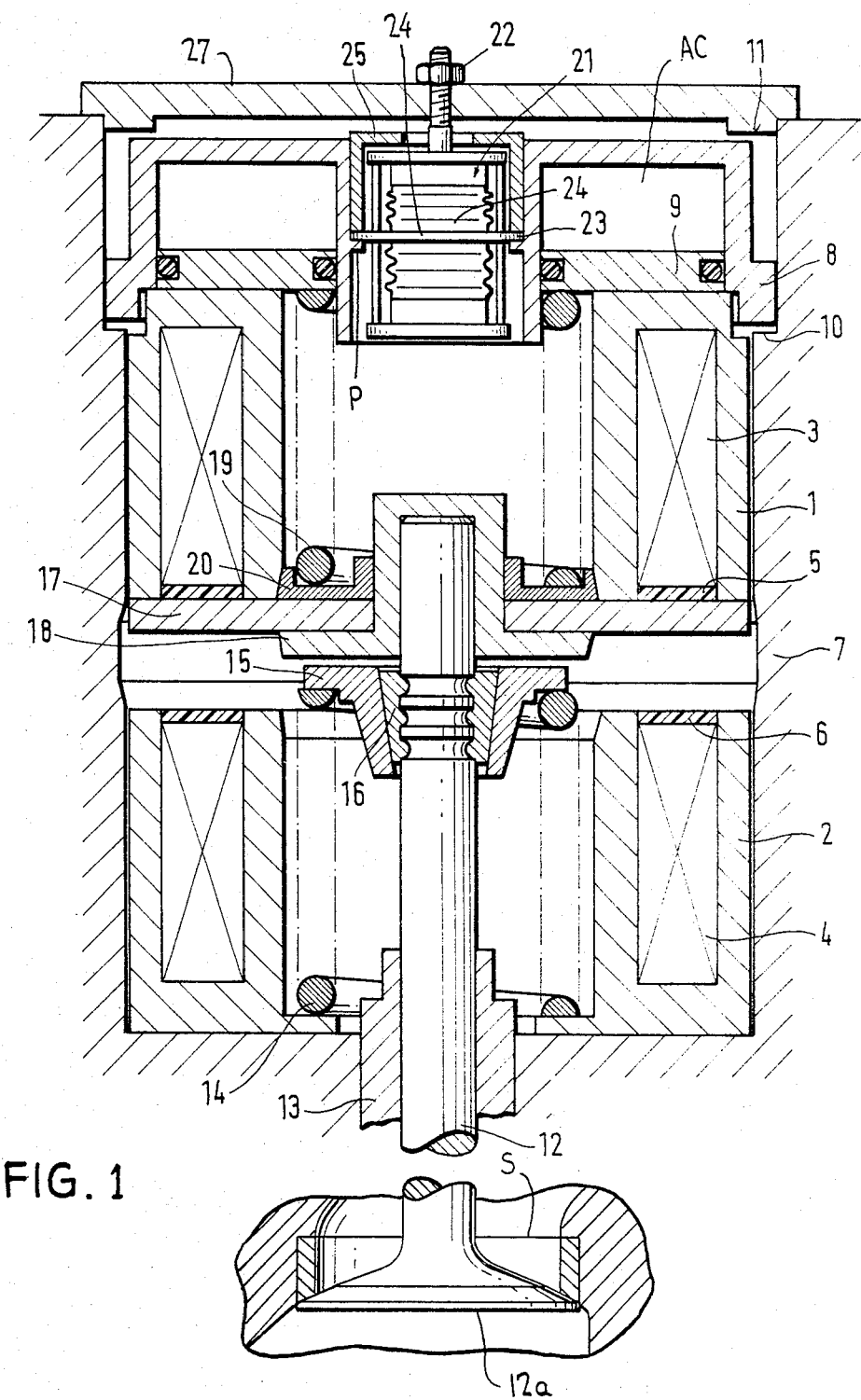
FIG. 1 is a longitudinal sectional view of one embodiment of the arrangement according to the invention.

Turning now to the drawings wherein like reference characters refer to like and corresponding parts throughout the several views, FIG. 1 illustrates an arrangement for an electromagnetically operated actuator which includes annular electromagnets 1 and 2 respectively containing winding coils 3 and 4 as well as coil covers 5 and 6. Electromagnet 2 is fixedly mounted within the cavity of a housing 7 which may comprise a cylinder head for an internal combustion engine. On the other hand, electromagnet 1 is mounted within the cavity of the housing for axial sliding movement together with a pneumatic biasing means which comprises an annular cylinder 8 and an annular ring-shaped piston 9 having outer and inner ring seals to define a variable volume air chamber AC with the cylinder. Piston 9 is magnetically attracted to electromagnetic 1 in its FIG. 1 position in which electromagnet 1 is energized. When electromagnet 1 is de-energized, piston 9 is free to slide into cylinder 8 under the force of spring 19 (to be described in more detail hereinafter) for compressing the air contained in chamber AC. Cylinder 8 is attached to electromagnet 1 so that, upon such inward movement of the piston, the cylinder and the electromagnet slide upwardly in response to the compressed air volume within the cylinder. Axial movements are limited by shoulders 10 and 11 which define limit stops respectively on housing 7 and a cap 27 fixedly mounted over the housing cavity. A poppet valve 12 is guided within a valve stem guide 13 fixedly mounted to housing 7. A compression spring 14 is coupled to the valve stem in a conventional manner via a spring plate 15 and valve collets 16 which engages the valve stem. An armature 17 is frictionally connected to the valve stem via a centering disc 20 and by an armature guide 18 which frictionally engages the upper end of the valve stem. Coil spring 19 extends between piston 9 and disc 20 for assisting in maintaining the armature connected to the valve stem. Electromagnet 1, together with the biasing means, is positioned within the housing cavity by a bilaterally operating, length-compensating element 21 shown in more detail in FIG. 6. This element 21 is fixedly connected to cap 27 mounted on the housing by means of a bolt and spaced nuts 22. And, a collar 23 of an axially slidable piston 24 of element 21 is attached via cylinder 8 to electromagnet 1 by means of an externally threaded sleeve 25 which bears against collar 23 supported on a projection P of cylinder 8, so that changes in length of the actuator are transmitted to the length-compensating element. It will be seen that the construction of this length-compensating element is such as to permit the transmission of compressive as well as tensile forces.

Figure 2:
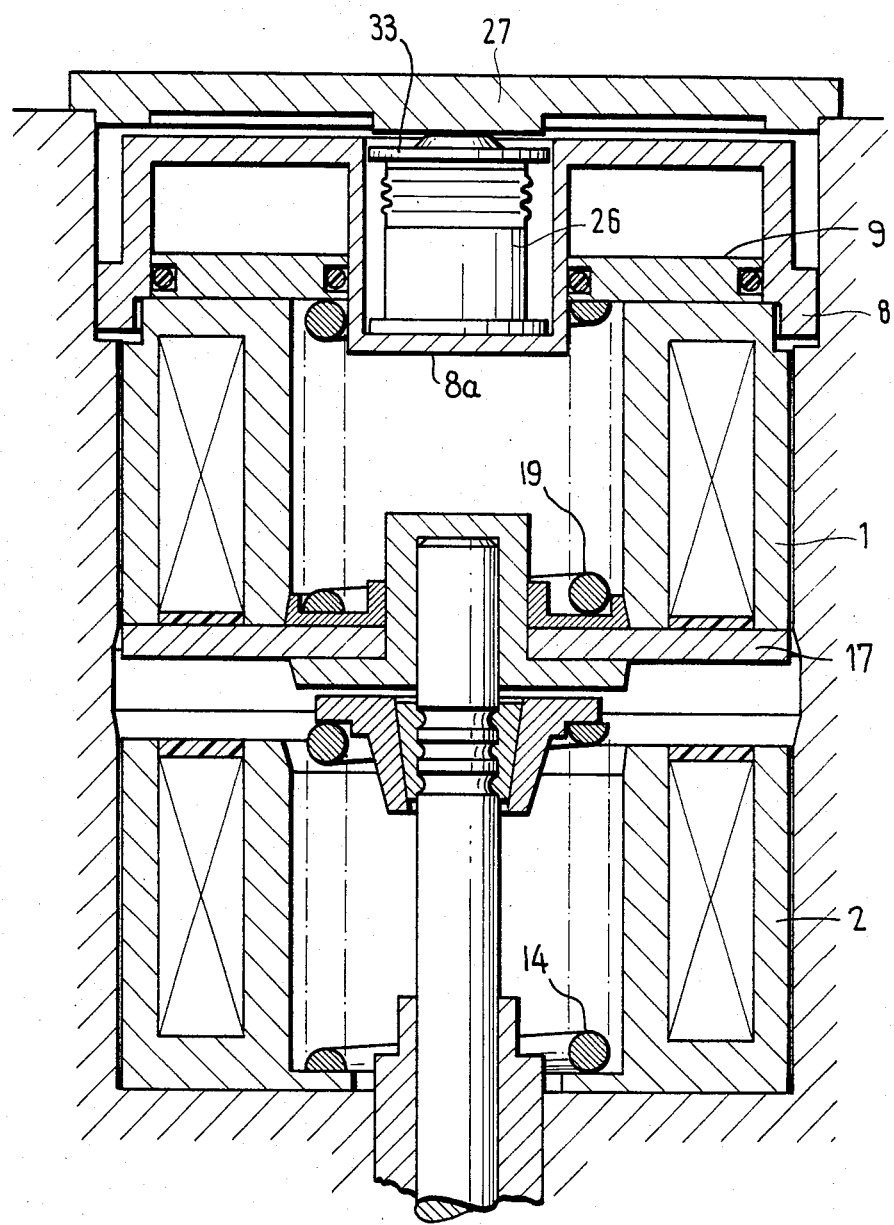
FIGS. 2 to 4, are similar views of other arrangements according to the invention.
Figure 5:
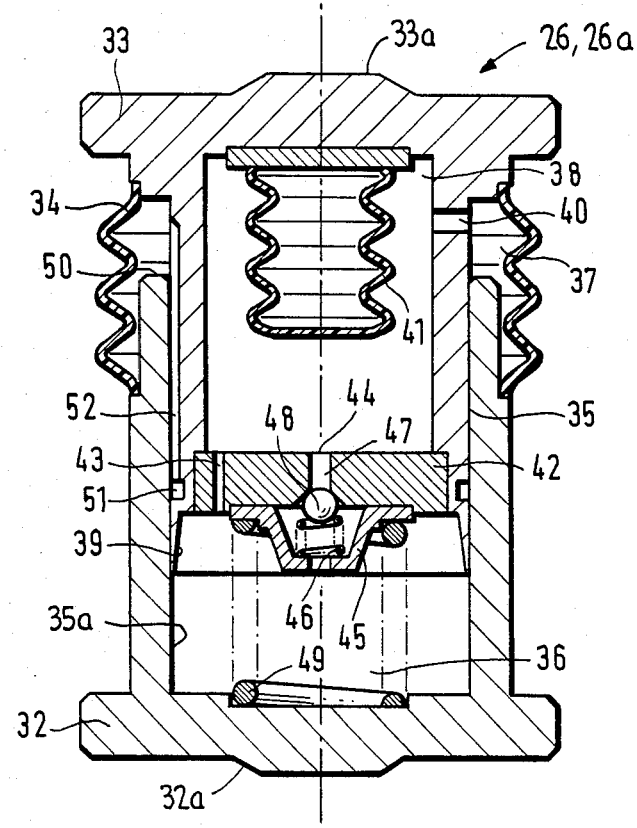
FIGS. 5 and 6 are vertical sectional views of length-compensating elements incorporated in the arrangements according to the invention.

FIG. 2 illustrates an electromagnetic actuator according to the invention which incorporates a unilaterally operating length-compensating element 26 shown in detail in FIG. 5 for the positioning of axially movable electromagnet 1. This length-compensating element is disposed in the central recess of cylinder 8 and is maintained therein by cover 27. This friction-type mounting of element 26 permits the transmission of compressive forces only.

Figure 3:
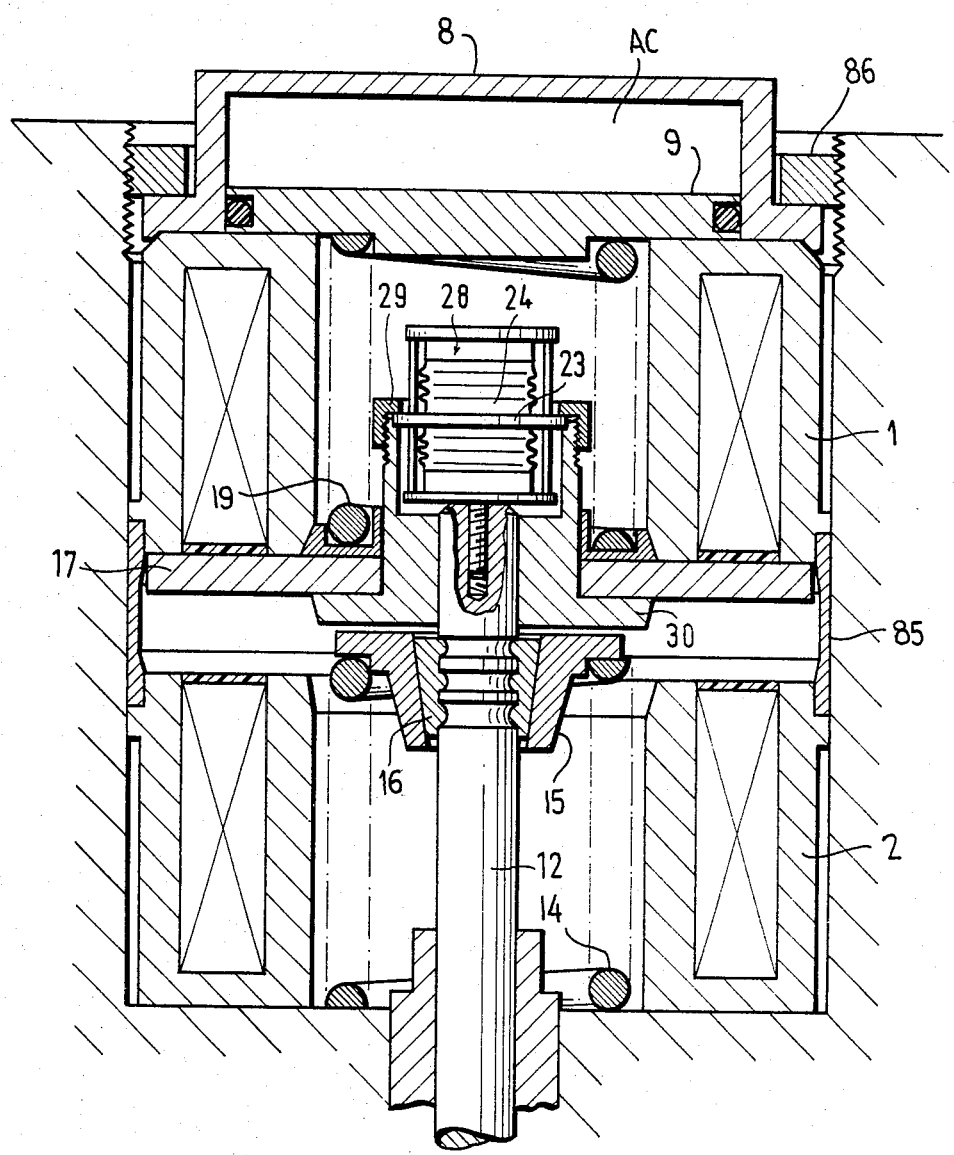
Figure 6:
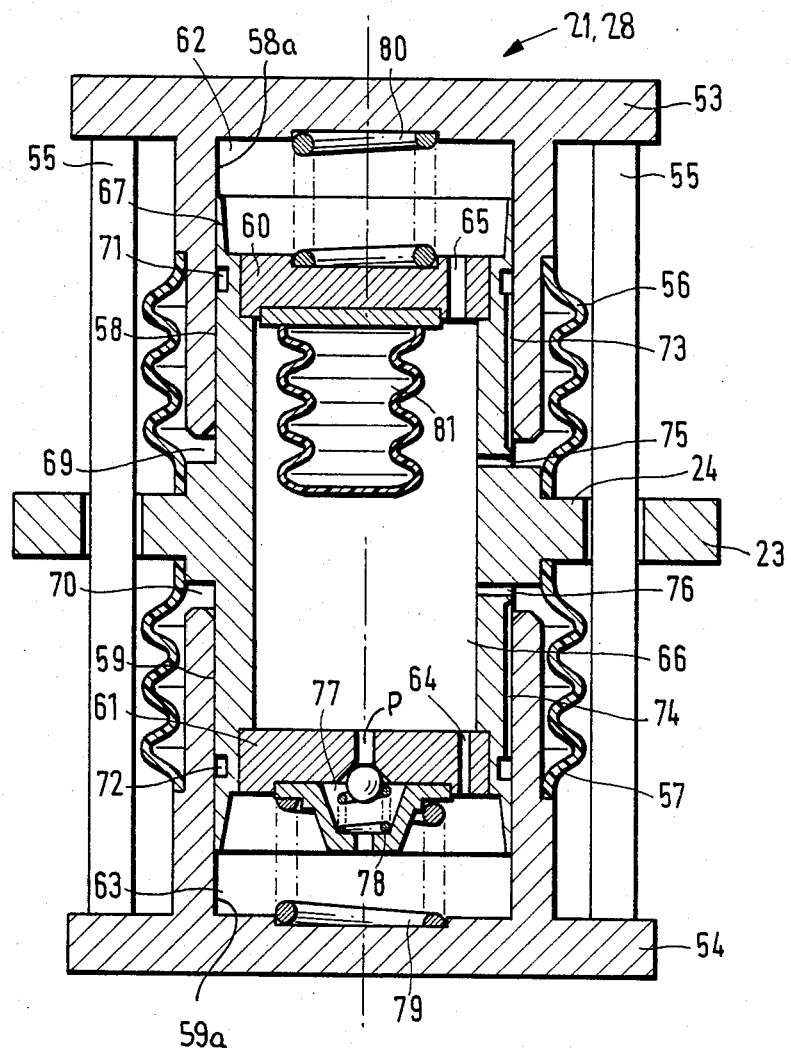

FIG. 3 shows an electromagnetic actuator with a bilaterally operating length-compensating element 28 which is the same as element 21 shown in FIG. 6. This element 28 is threadedly secured to the upper end of valve 12. And, by means of a union nut 29, piston 24 of element 28 is connected to armature 17 by means of a guide sleeve 30 which slideably engages the valve stem. In this embodiment, electromagnet 1 is fixedly mounted within the housing cavity between fixed rings 85 and 86. Cylinder 8 overlies electromagnet 1, and piston 9, which is slideable therein as described with reference to FIG. 1, as magnetically attributed to electromagnet 1 in FIG. 3.

Figure 4:
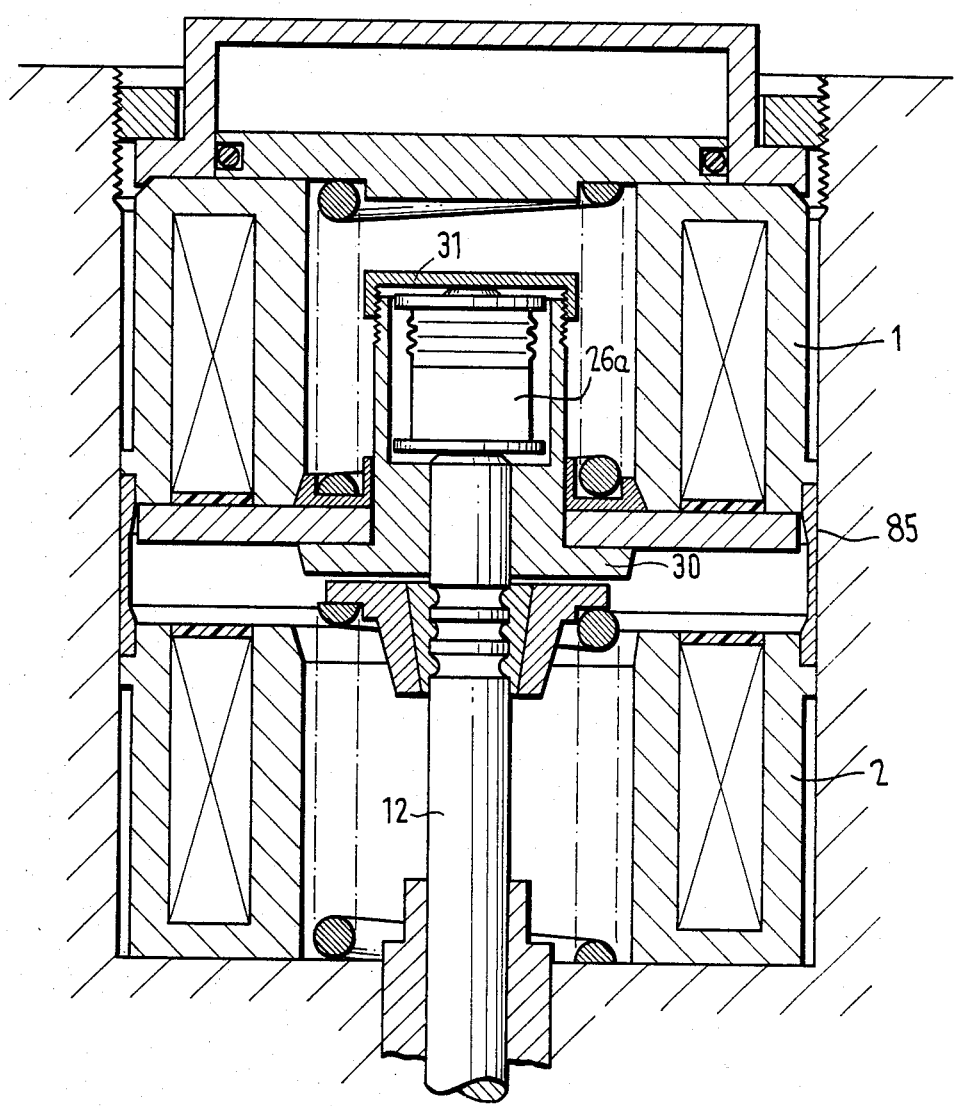

The FIG. 4 arrangement is essentially the same as FIG. 3 except that it includes an electromagnetic actuator with a unilaterally operating length-compensating element 26a which is the same as element 26 shown in FIG. 5 and which is frictionally mounted to the top of the valve stem by a cover 31 threaded onto guide sleeve 30 so that only compressive forces can be transmitted.

The unilaterally operating length-compensating element 26, 26a is shown in detail in FIG. 5 and in the aforementioned related application which is for this purpose specifically incorporated herein by reference. The element comprises a cylinder 32 and a piston 33 interconnected together in a fluid tight manner by a bellows 34 so that fluid cannot escape therefrom and pollutants cannot enter therein. Curved surfaces 35 and 35a of the piston and cylinder have a slight clearance therebetween and slide relative to one another during relative axial sliding movement of the piston and cylinder, and these surfaces function as guide as well as sealing surfaces. The piston and cylinder define a variable volume pressure chamber 36 therebetween, and a leakage chamber 37 is defined between the bellows and the telescoping portion of the piston and cylinder. And, the piston is hollow to define a fluid reservoir 38. The slight clearance between walls 35, 35a is sealed closed from the pressure chamber by the provision of a resilient, thin-walled annular lip seal 39 on the piston which projects into the pressure chamber. Thus, the pressure chamber is sealed closed, outwardly of the piston, from the leakage chamber and the fluid reservoir. Leakage fluid can return into fluid reservoir 38 through an opening 40 provided on the piston wall. Fluid reservoir 38 contains a gas-filled bellows 41 which functions as an accumulator and a volume-compensating element which is fixedly mounted at the underside of the outer wall at the piston. An inner end wall or cap 42 of the piston contains an outlet port 43 and a spring-loaded check-valve 44. A spring cage 45 supports a spring 46 which biases a ball check 48 against its valve seat for closing a passage 47 located in cap 42. The spring cage bears against the underside of cap 42 without being fixedly secured thereto and is maintained thereagainst by a return spring 49. Free end 50 of the cylinder serves as an end stop to limit relative inward movement of the piston and cylinder. And, the piston is provided with an annular groove 51 which lies just above its sealing lip 39, and a connecting groove 52 which extends from groove 51 into leakage compartment 37.

FIG. 6 shows the details of bilaterally operating length-compensating element 21, 28 which comprises a bilaterally operating piston 24 and two cooperating cylinders 53 and 54 which are rigidly interconnected by rods 55. Piston 24 is interconnected with cylinders 53 and 54 in a fluid tight manner via bellows 56 and 57, so that liquids cannot escape from the length-compensating element and pollutants cannot enter therein. Cylindrical confronting surfaces 58, 58a and 59, 59a, of the piston and cylinders, which slide relative to one another during piston movement, function as guide as well as sealing surfaces. Opposite ends of the piston are covered by end caps 60 and 61 such that the piston defines with cylinder members 53 and 54 hydraulic containing variable volume pressure chambers 62 and 63. The end caps include overflow ports 64 and 65 and define with the piston an internal cavity comprising a fluid reservoir 66. Therefore, during piston movement into cylinder 53 or into cylinder 54, hydraulic liquid may flow into fluid reservoir 66 respectively through overflow ports 65 or 64. And, the piston has annular, resilient lip seals 67 and 68 which project into chambers 62 and 63, respectively, and engage inner walls 58a and 59a of the cylinders for preventing fluid from the pressure chambers from being discharged through the clearances between the confronting outer and inner cylindrical walls of the piston and cylinder from entering leakage compartments 69 and 70 which are defined by the bellows together with the telescoping portions of the piston and cylinder. The piston has outer annular grooves 71 and 72 disposed inwardly of its lip seals, and connecting grooves 73 and 74 extending between the annular grooves and the leakage chambers. In such manner, any fluid in the clearances between the confronting walls of the piston and cylinders will not interfere with the tight sealing action between the lip seals and walls 58a, 59a.

A small unavoidable amount of leakage fluid can flow back into the fluid reservoir 66 via return-flow ports 75 and 76 located in the wall of the piston, the ports interconnecting respective leakage chambers with the fluid reservoir. Piston end cap 61 likewise has a passage P controlled by a ball check 77 urged against its seat by a coil spring 79 supported against the inner wall of a spring cage 78 which is maintained in place against the outer surface of end cap 61 by a return spring 79 which bears against the inner surface of the end wall of cylinder 54. And, a return spring 80 extends between end cap 60 of the piston and the inner surface of the end wall of cylinder 53.

Figure 7:
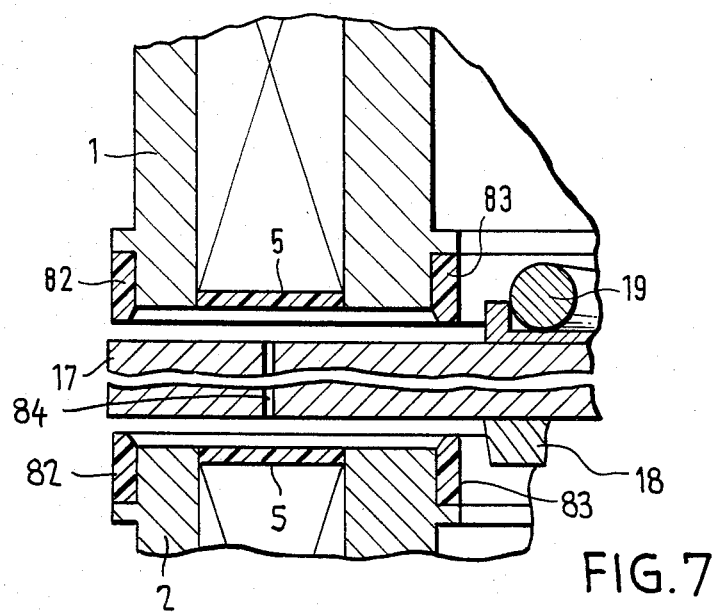
FIGS. 7 and 8 are views similar to FIGS. 1 and 3 and showing, in part, and at an enlarged scale, the dampening features of the invention.

One embodiment of the dampening arrangement according to the invention is shown in FIG. 7 which includes annular inner and outer rings 82 and 83 of non-magnetic elastomeric material fluid tightly secured in any normal manner to electromagnet 1. The rings project outwardly of the end face of electromagnet 1 and confront armature 17 so as to form a hermetically closed space upon contact with the armature during its valve closing movement for pneumatically dampening the contact approach between electromagnet 1 and the armature. A vent opening 84 is located in the armature between rings 82, 83 for allowing escape of compressed gas therethrough to avoid any interference with the seating of valve head 12a of the poppet valve against its valve seat S as shown in FIG. 1. Rings 82 and 83 may be similarly provided on electromagnet 2 in the same manner and for the same purpose as described relative to electromagnet 1 so as to provide for pneumatically dampening the contact between electromagnet 2 and armature 17 during the unseating of valve 12a from its valve seat S.

Figure 8:
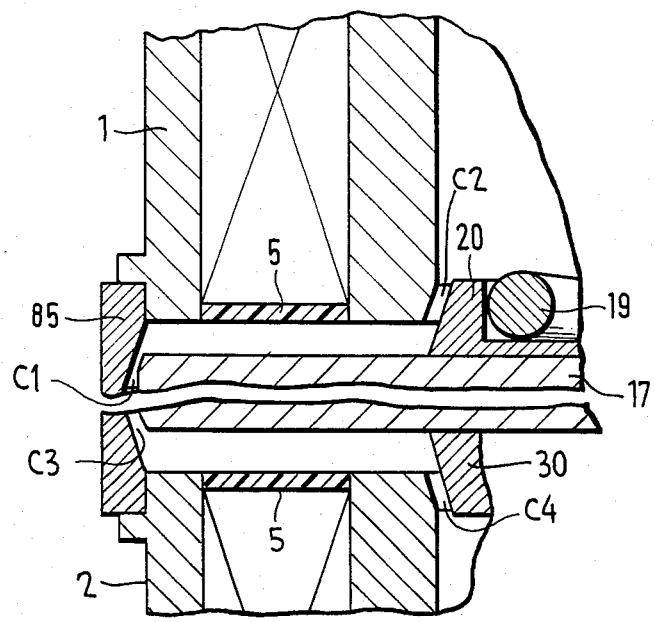

An alternative arrangement provided for dampening the electromagnetic actuator according to the invention is shown in FIG. 8 by the provision of an enclosed space between electromagnet 1 and the armature is defined by the confronting surfaces thereof, an annular ring 85 fixedly mounted on the wall of the housing cavity, and centering disc 20 which is maintained tightly against armature 17 by spring 19. A clearance or channel C1 is defined between the outer edge of the armature and a confronting surface of ring 85, and a clearance or channel C2 is defined between an outer surface of disc 20 and an inner edge of electromagnet 1. Thus, the enclosed volume of air is not hermetically closed as in the FIG. 7 embodiment, since compressed air can escape through the clearances as the confronting surfaces of the armature and electromagnet 1 proceed to contact one another.

In a similar manner, an enclosed space for dampening is provided between electromagnet 2 and the armature as defined by the confronting surfaces thereof, annular ring 85, and spring plate 15. A clearance or channel C3 is defined between the outer edge of the armature and a confronting surface or ring 85, and a clearance or channel C4 is defined between an outer surface of plate 15 and an inner edge of electromagnet 2.

Figure 9:
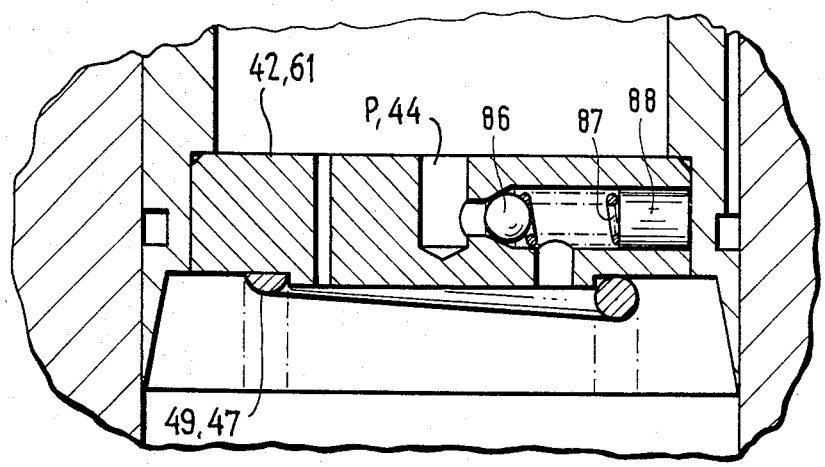
FIGS. 9 and 10 are views similar to FIGS. 5 and 6 of parts of the hydraulic compensating element, at an enlarged scale, as having modified check valve arrangements.
Figure 10:
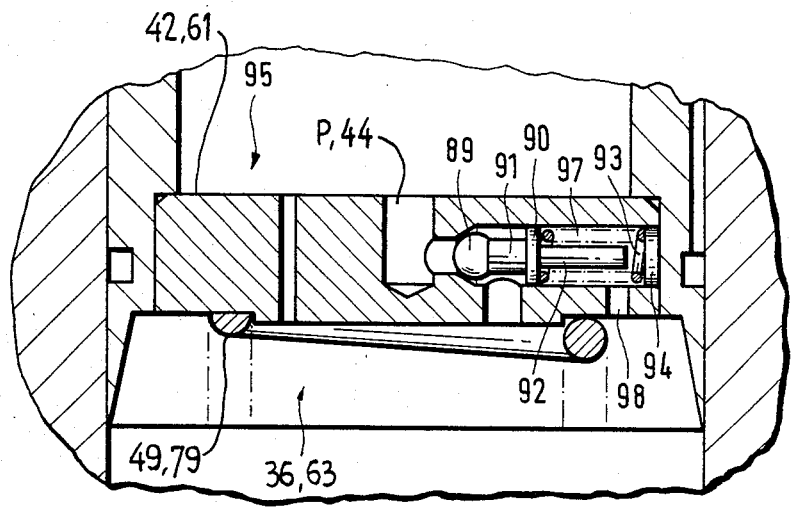

FIGS. 9 and 10 are similar to FIGS. 2 and 3 of the aforementioned related application and show modified check valve arrangements for passages P, 44 respectively located in end caps 42 and 61 of the piston. Here, the valve cages are eliminated, and the check valve of FIG. 9 comprises a ball check 86 pre-loaded by a plug 88 and being urged against its valve seat by a spring 87, the ball check, spring 87 and plug 88 lying in a passage disposed perpendicular to the direction to the central axis of the piston/cylinder unit along which the external loads are normally applied, to thereby avoid an unseating of the check-valve in response to relatively small external loads.

The check-valve arrangement of FIG. 10 comprises a ball check 89 mounted on a cylindrical stud member 91 connected to a circular guide disc 90 having a cylindrical mandrel 92 thereon, a coil spring 93 bearing against the guide disc for resiliently urging the ball check against its valve seat. The ball check and its connected parts are disposed for movement in a direction lying perpendicular to the central axis of the piston/cylinder unit along which external loads are normally applied. A valve chamber 97, into which mandrel 92 extends, communicates with pressure chamber 36, 63 through an opening 98 such that opposite sides of the guide disc are exposed to the pressure chamber.

The parts of the check valve are so dimensioned that, with the external loads usually applied to the length-compensating element at right angles to the direction of movement of the check valve, the mass moment of inertia of mandrel 92 with the mass moment of inertia of ball check 89 and of stud member 91 in relation to guide disc 90 are of equal magnitude so that, an unseating of the ball check is substantially neutralized against external loads applied to the length compensating element which would tend to unseat the check valve.

The mode of operation of the unilaterally and bilaterally operating length-compensating elements will be first described, then their application to electromagnetic actuators.

When an external force acts upon the length-compensating element shown in FIG. 5 which tends to slide the piston and cylinder relatively inwardly, the pressure in chamber 36 increases as its volume decreases even if the stroke differences between piston 33 and cylinder 32 are small. This high pressure expands lip seal 39 radially outwardly and causes it to be pressed against cylinder wall 35a to thereby sealingly close the pressure chamber against leakage via the clearance between surfaces 35, 35a. Even with rapid load changes, the hydraulic fluid between confronting cylindrical surfaces 35 and 35a can be quickly discharged via grooves 51 and 52 into leakage chamber 57 so as to avoid any interference with the fluid tight seal between the lip seal and cylinder surface 35a. Since ball check 48 is closed against its valve seat in response to an increase in pressure with chamber 36, only a very small amounts of hydraulic fluid can flow from the pressure chamber through discharge port 43 into fluid reservoir 38, so that stroke changes of the piston/cylinder unit induced by externally applied forces are possible only to a very small extent.

The unavoidable leakage of fluid between the piston and the cylinder flows into leakage chamber 37 and through port 40 into fluid reservoir 38 which reservoir is sufficiently large such that all the fluid displaced from the pressure chamber can be received therein by properly compressing the volume of gas in bellows 41. Upon reduction of the externally applied load on the length-compensating element, spring 49 equalizes differences in length of the element by moving piston 33 out of cylinder 32 until an equilibrium of forces is attained with the externally applied loads. Check valve 44 thus opens in response to the volume increase in the pressure chamber and in response to a slight overpressure within fluid reservoir 38 so as to assure a fast exchange of hydraulic liquid through the open check valve and thereby a rapid assuming of the new position determined by the equilibrium of forces. The maximum elongation of the length-compensating element during relative outward movement of the piston is limited by the greatest possible elongation of bellows 34. The bellows is suitably constructed to have sufficient mechanical strength to permit such linear extension within predetermined limits and to withstand any torques acting between the piston and cylinder. And, one or both of the outer end walls of the piston and cylinder may be thickened as at 32a and 33a at the central area thereof such that the external loads applied thereto cannot exert a considerable torque.

The mode of operation of the length-compensating element shown in FIG. 6 is dependent upon the direction of the external load being applied. Thus, if an external load is applied to piston 24 via collar 23 in the direction of cylinder 54, then, even with a small stroke differences between piston 24 and cylinder 54, pressure within chamber 63 increases and lip seal 68 is pressed radially outwardly into tight sealing engagement with wall 59a. Since check valve 77 closes in response to this increase in pressure within chamber 63, fluid can flow from the pressure chamber only through overflow port 64, so that a controlled movement of the piston within the cylinder can be monitored by appropriately designing and sizing overflow port 64. The sealing action of lip seal 68 is enhanced by the flow of leakage fluid from between surfaces 59 and 59a via grooves 72 and 74 into leakage chamber 70, so that the sealing action of the lip seal arises spontaneously even under quickly changing external loads. Any unavoidable leakage fluid can, of course, flow back into fluid reservoir 66 through return-flow port 76. And, during movement of piston 24 in the direction of cylinder 54, fluid from fluid reservoir 66 can be discharged into pressure chamber 62 via overflow port 65. Gas-filled bellows 81 in fluid reservoir 66 serves to equalize pressure and volume fluctuations by responding thereto. If a load is applied to the length-compensating element in the manner aforedescribed, only small changes in stroke will occur, dependent upon the extent of the external force applied and upon the time duration of the applied force.

If the applied external load is reversed such that the piston is moved into cylinder 53, overflow port 65 in end cap 60 will ensure a fast discharge of the fluid from pressure chamber 62 into fluid reservoir 66, so that the pressure in chamber 62 will increase only slightly. However, the pressure in chamber 62 is sufficient to expand lip seal 67 radially outwardly into tight sealing engagement with wall 58a, so that the movement of the piston in the cylinder 53 can be controlled by appropriately designing and sizing overflow port 65. And, check valve 77 opens in response to an overpressure in reservoir 66 and an increase in volume in chamber 63 to thereby permit an exchange of fluids between fluid reservoir 66 and pressure chamber 63. With such an arrangement, relatively large changes in stroke will occur, depending upon the extent of the external load being applied and the time duration thereof.

The electromagnetic actuator arrangement of FIG. 1 includes bilaterally operating length-compensating element 21 of FIG. 6. During operation, element 21 positions electromagnet 1 relative to housing 7 in such a manner that the changes in length occuring between the pole areas of armature 17 and head 12a of poppet valve 12 correspond to the distance between the pole areas of electromagnet 1 and valve seat S. Thus, compensating element 21 is disposed so that in FIG. 1 pressure chamber 63 lies at the top of the piston/cylinder unit such that element 21 when viewed in FIG. 6 is rotated through 180 degrees.

During the "off" period of electromagnet 1 when it is deenergized, the magnetic attraction between piston 9 and the electromagnet is released and, the spring force of spring 19, which exceeds that of spring 79, urges piston 9 into its cylinder 8 to thereby compress the air within chamber AC and accordingly cause cylinder 8 and electromagnet 1 attached thereto to be moved upwardly, during which movement the fluid from pressure chamber 63 is metered therefrom through overflow port 64 into fluid reservoir 66. Electromagnet 2 is turned "on", i.e., energized, at the same time as electromagnet 1 is turned "off", for magnetically attracting the armature against the bias of spring 14 into a valve open position. When electromagnet 1 is reenergized and during the approach of armature 17, the electromagnetic force overcomes the force of spring 19 so that electromagnet 1 magnetically attracts piston 9 and armature 17 into contact therewith to thereby raise the poppet valve into its valve closing position shown in FIG. 1 under the force of spring 14. Downward movement of electromagnet 1 together with cylinder 8 is facilitated by open check valve 77 and by the flow-promoting shape of overflow port 65 as well as the force of spring 79 which exceeds that of spring 80. The desired time response of a positioning procedure can be adjusted by appropriately designing check valve 77, overflow ports 64 and 65, and springs 79 and 80.

The FIG. 2 arrangement is essentially the same as that of FIG. 1 except that the electromagnetic actuator includes a unilaterally operating length-compensating element 26 shown in more detail in FIG. 5. Element 26 is disposed within a central cavity 8a of cylinder 8 with its pressure chamber 36 lying uppermost such that, when viewing FIG. 5, element 26 is rotated throughout 180 degrees. When electromagnet 1 is deenergized into its "off" position, and electromagnet 2 is energized into its "on" position, from that of FIG. 2, spring 19 moves piston 9, now magnetically released, into its cylinder 8 such that the entrapped air within cylinder 8 is compressed causing cylinder 8 to move upwardly together with electromagnet 1 which is connected thereto. Piston 33 of element 26 is thus shifted into its cylinder 32 and pressurizes the hydraulic fluid within pressure chamber 36 so that a small amount of the fluid is discharged into fluid reservoir 38 through discharge port 43. As in the FIG. 1 embodiment, the force of spring 19 exceeds that of spring 49. The armature is attracted to electromagnet 2 against the bias of spring 14 to thereby open the poppet valve. When electromagnet 1 is switched on again and electromagnet 2 is switched off again, no forces can be transmitted to the electromagnets by the compensating element. By means of spring 49, the difference of length that has occured is quickly equalized as it urges cylinder 8 downwardly together with electromagnet 1 whereupon check valve 44 opens as the volume of pressure chamber 36 expands to thereby result in a quick overflow of the fluid from fluid reservoir 38 into pressure chamber 36.

The electromagnetically operated actuator of FIG. 3 includes a bilaterally operating length-compensating element 28 shown in detail in FIG. 6. Unlike the actuators of FIGS. 1 and 2, length-compensating element 28 adjusts the distance between the pole areas of armature 17 and valve head 12a to the distance between the pole areas of electromagnet 1 and valve seat S by adjusting the position of valve stem 12 relative to armature 17. And, the length-compensating element is so disposed in FIG. 3 that its pressure chamber 63 lies at the bottom as when viewing FIG. 6.

When electromagnet 1 is deenergized and electromagnet 2 is energized, magnetic attraction of the armature and piston 9 is released causing piston 9 to be moved into its cylinder 8 compressing the air in chamber AC under the action of spring 19. And, poppet valve 12 is moved to an open position away from its valve seat as the armature is attracted to electromagnet 2. Piston 24 of element 28 is thus forced into cylinder 54 as guide sleeve 30 is caused to slide downwardly relative to the poppet valve stem under the force of spring 19. The poppet valve is maintained in its open position as armature 17 under magnetic attraction with electromagnet 2, so that the position of piston 24 relative to electromagnet 2 is fixed. The force of spring 19 acting on the poppet valve via length-compensating element 28 is opposed by the inertia force of the poppet valve and by the force of spring 14. Since check valve 77 is closed, only small amounts of hydraulic fluid flow from pressure chamber 63 to fluid reservoir 66 through discharge port 64, so that only very small relative movements are possible between armature 17 and valve 12 and the poppet valve opens in the desired manner.

As shown in FIGS. 7 and 8, armature 17 is dampened, during both poppet valve opening and closing operations, as the air volume formed between the armature and the confronting ends of the electromagnets, is compressed during the approach of the armature to a given electromagnet. The inertia force of the poppet valve is only opposed by a small flow resistance of the hydraulic fluid flowing through the check valve of the length-compensating element which is open, so that the movement of poppet valve 12 goes beyond the maximum stroke possible when armature 17 and valve 12 are rigidly coupled together. Thus, during the time when the armature is held against electromagnet 2 under magnetic attraction, spring 14 bears against length-compensating element 28 via spring plate 15 and valve collets 16 connected to the valve so that with check valve 77 closed only small amounts of hydraulic fluid flow from pressure chamber 63 through return-flow port 64 into fluid reservoir 66 and, as a result, spring 14 returns the poppet valve to a position at which it is essentially rigidly coupled together with the armature. Now, when electromagnet 2 is switched off and electromagnet 1 is switched on, spring 14 shifts the valve relative to guide sleeve 30 so as to return the piston of element 28 to its operated position shown in FIG. 3 and is maintained in such position as the armature is magnetically maintained in contact with electromagnet 1.

By the appropriate design and sizing of overflow port 64, the desired amount of dampening can be provided for valve 12 as it seats against its valve seat S, and for armature 17 as it contacts electromagnet 1. In the operational position shown with the poppet valve seated, the flux force between electromagnet 1 and spring 19 is closed via armature 17, centering sleeve 30 and piston 9, the magnetic attraction of the armature being effected against a smaller flow resistance as a result of the flow-promoting shape of overflow port 65 and check valve 77. The frictional engagement between armature 17 and guide sleeve 30 is effected by the force of spring 79 which exceeds that of spring 80 of element 28. Spring 79 effectively bears against valve 12 which is maintained on its seat under the force of spring 14 which exceeds that of spring 79. Thus, axial changes of length of the valve occuring during operation can be equalized.

The FIG. 4 arrangement is similar to that of FIG. 3 except that it includes a unilaterally operating length-compensating element 26a shown in detail in FIG. 5. This element 26 functions similar to that of element 28 of FIG. 3, and is disposed such that pressure chamber 36 thereof lies at the bottom when viewed in FIG. 5.

The valve opening operation corresponds to that described for length-compensating element 28 relative to FIG. 3. Changes in length during operation of the actuator which result in elongation of element 29, cannot be hydraulically limited, since no tensile forces can be transmitted by element 26a. These differences in length are equalized by spring 49 of element 26a.

In the FIG. 7 arrangement provided for impact dampening for electromagnet actuators, during the poppet valve closing operation, armature 17 moves unhindered toward electromagnet 1 until elastomeric seal rings 82 and 83 come into contact with armature 17 to thereby form a volume of air between the confronting surfaces of the armature and the electromagnet which hermitically closed. As the armature continues its movement toward electromagnet 1, this volume of air is compressed to thereby dampen the armature during the process of contacting electromagnet 1. It should be pointed out that the seal rings are so designed as to essentially perform a sealing, but not a dampening, function.

And, during the poppet valve opening operation, the armature is similarly dampened in the process of making contact with electromagnet 2.

An air vent 84 it is shown located in armature 17 at a location between rings 82 and 83, through which compressed air may escape after contact is made between the armature and the rings so as to avoid any interference with the seating of the poppet valve. This vent 84 could alternately be provided in either of the electromagnets, or in one or both of rings 82, 83.

In the FIG. 8 arrangement, the air volume defined between confronting surfaces of electromagnet 1 and the armature, and confined by ring 85 and centering disc 20, is not fully enclosed so as to be absolutely impervious to air. Thus, as armature 17 approaches electromagnet 1, clearances C1 and C2 becomes smaller and are reduced to zero upon impact of the armature against electromagnet 1, to thereby prevent compressed air from escaping. Thus, the need for a vent such as 84 is eliminated. Similar dampening is provided between the armature and electromagnet 2 during poppet valve opening.

The impact dampening arrangements aforedescribed for electromagnetic actuators are likewise suited for other electromagnets, relays or similar devices in which one or more parts moving at right angles to the pole areas can be brought to, or maintained in, one or more positions by electromagnetic or other forces, so as to restrain the impact of the moving parts on the pole areas.

If the length-compensating elements shown in FIGS. 5 and 6 are included within the electromagnetic actuators of FIGS. 3 and 4, they are subjected to considerable accelerations. To insure the functional reliability for these applications, it may be necessary to vary the geometry of the check valve. Such check valve modifications are shown in FIGS. 9 and 10.

Obviously, many other modifications and variations of the present invention are made possible in the light of the above teachings. It is therefore to be understood that within the scope of the appended claims the invention may be practiced otherwise than as specifically described.

What is claimed is:

1. An arrangement for an electromagnetically operated actuator for a displacement type engine having a spring-mass valve actuating oscillatory system which includes a valve operable relative to its valve seat within a housing, an armature connected to said valve, a pair of electromagnets on opposite sides of said armature for maintaining said valve in at least first and second final operational positions of the maximum amplitude of vibration, dampening means comprising said armature and at least one of said electromagnets, a hydraulic length-compensating element for mounting said one electromagnet on said housing for adjusting the distance between said valve seat and the pole area of said one electromagnet so that it corresponds to the distance between said valve head and the pole face of said armature, whereby substantially consistent dampening is effected as said armature approaches said one electromagnet and said valve head approaches said valve seat both with substantially the safe velocity.

2. An arrangement for an electromagnetically operated actuator for a displacement-type engine having a spring-mass valve actuating oscillatory system which includes a valve having an armature thereon and being operable relative to its valve seat within a housing, a pair of electromagnets on opposite sides of said armature for maintaining said valve in at least first and second final operational positions of the maximum amplitude of vibration, dampening means comprising said armature and at least one of said electromagnets, a hydraulic length-compensating element for connecting said armature to said valve for adjusting the distance between the head of said valve and the pole area of said armature to correspond to the distance between said valve seat and the pole area of said one electromagnet, whereby substantially consistent dampening is effected as said armature approaches said one electromagnet and said valve head approaches said valve seat both with substantially the same velocity.

3. The arrangement according to claim 1 or 2, wherein said hydraulic length-compensating element comprises at least a pair of relatively slideable parts defining therebetween a hydraulic-containing variable volume pressure chamber, one of said parts containing a fluid reservoir for the reception of hydraulic fluid from said chamber upon relative inward movement of said parts, means interconnecting said parts together in a fluid tight manner, and passage means on said one part through which hydraulic fluid may flow between said reservoir and said chamber upon relative movement of said ports.

4. The arrangement according to claim 3, wherein said parts comprise a piston/cylinder unit in which the other of said parts comprises a cylinder, and said one part comprises a hollow piston containing said fluid reservoir and being slideably received within said cylinder.

5. The arrangement according to claim 4, wherein outer and inner confronting surfaces respectively of said piston and said cylinder define guide surfaces for said parts during relative sliding movement, said surfaces forming a slight clearance therebetween.

6. The arrangement according to claim 5, wherein said piston has an annular resilient lip seal thereon projecting into said pressure chamber and having an outer diameter corresponding to that of the outer diameter of said piston, said lip seal, under the operating pressure of the hydraulic fluid in said pressure chamber, expanding radially outwardly into tight sealing engagement with said inner surface of said cylinder in response to said operating pressure for sealing said pressure chamber from said clearance.

7. The arrangement according to claim 1, wherein a gas-filled accumulator is fixedly mounted on said one part and extends into said fluid reservoir for maintaining the pressure therein substantially constant during sliding movement of said parts.

8. The arrangement according to claim 1, wherein said means interconnecting said ports together comprises a bellows of a predetermined mechanical strength permitting linear extension of said element within predetermined limits and withstanding any torques acting between said parts.

9. The arrangement according to claim 4, wherein said passage means includes an end wall on said piston having an outlet port therein sized to permit flow of hydraulic fluid from said chamber to said reservoir at a predetermined rate.

10. The arrangement according to claim 9, wherein said passage means further includes a one-way valve-controlled passage sized to permit flow of hydraulic fluid from said reservoir to said chamber at a rate higher than said predetermined rate.

11. The arrangement according to claim 5, wherein said means interconnecting said parts together defines a leakage chamber surrounding said fluid reservoir, said clearance between said surfaces being in communication with said leakage chamber, and said piston having a bore therein extending between said leakage chamber and said fluid reservoir through which leakage fluid may enter into said fluid reservoir.

12. The arrangement according to claim 11, wherein said outer surface of said piston has an annular groove disposed inwardly of said lip seal, and has at least one connecting groove extending from said annular groove to said leakage chamber, whereby any pressure between said surfaces is reduced as leakage fluid in said clearance is discharged into said leakage chamber to thereby avoid any interference with said tight sealing engagement between said lip seal and said inner surface even in response to quick changes of external loads applied causing said parts to slide relatively inwardly.

13. The arrangement according to claim 4, wherein an outer wall of one of said piston and said cylinder has a thickened portion lying along its central axis for absorbing externally applied loads acting on said thickened portion.

14. The arrangement according to claim 10, wherein a check-valve is disposed on said end wall for opening and closing movements relative to its valve seat in a direction angularly related to the central axis of said piston/cylinder unit along which external loads are normally applied, to thereby avoid an unseating of said check-valve.

15. The arrangement according to claim 10, wherein said end wall has a check-valve including parts comprising a ball check connected by a stud to a valve guide having a projection thereon, said guide having a mass movement of inertia of a magnitude equal to that of said ball check, said stud and said projection for neutralizing said check-valve against axial accelerations applied to said element which would tend to unseat said ball check.

16. The arrangement according to claims 1 or 2, wherein an end surface of electromagnet confronts said armature and therewith defines a portion of an air space for pneumatically dampening contact between said one electromagnet and said armature, said end surface lying perpendicular to the direction of movement of said armature.

17. The arrangement according to claim 1 or 2, wherein means confronting said armature at an end of said one electromagnet form an enclosed space upon contact with said armature for pneumatically dampening contact between said one electromagnet and said armature.

18. The arrangement according to claim 16, wherein means on said housing and on said armature comprise surfaces which further define said air space, said surfaces confronting and being spaced from surfaces of said one electromagnet and said armature to define clearances for venting air prior to said contact.

19. The arrangement according to claim 17, wherein said means comprise side walls extending outwardly of an end surface of said one electromagnet.

20. The arrangement according to claim 18, wherein said confronting surfaces are parallel to each other and are angularly related to the direction of movement of said armature, whereby said clearances are reduced in size in the process of said contact between said one electromagnet and said armature.

21. The arrangement according to claim 19, wherein said side walls are of elastomeric material for hermetically enclosing said space upon said contact with said armature.

22. The arrangement according to claim 21, wherein said armature includes a vent port for venting said space.

23. The arrangement according to claim 16, wherein said armature, said housing and said one electromagnet define vent channels for said air space, said channels changing in size during relative movement between said one electromagnet and said armature.

* * * * *